Oct. 14, 1969  D. J. KAPLAN  3,472,250

TORQUE CONVERTER CLEANING PROCESS AND APPARATUS

Filed Nov. 23, 1966

Inventor
Donald J. Kaplan
By Hofgren, Wegner,
Allen, Stellman & McCord
Attys

United States Patent Office 3,472,250
Patented Oct. 14, 1969

3,472,250
TORQUE CONVERTER CLEANING PROCESS
AND APPARATUS
Donald J. Kaplan, Owatonna, Minn., assignor to Owatonna Tool Company, a corporation of Minnesota
Filed Nov. 23, 1966, Ser. No. 596,661
Int. Cl. B08b 9/04, 3/02; B01f 1/00
U.S. Cl. 134—111                                    2 Claims

ABSTRACT OF THE DISCLOSURE

A torque converter cleaner having a power operated rocker frame for moving the torque converter back and forth in an arc while at the same time continuously flowing cleaning fluid through the torque converter and with the rocker frame including relatively movable members with springs interposed therebetween to provide a snap action in movement of the torque converter near the limits of its arc of travel to thoroughly distribute cleaning fluid in the torque converter.

---

Figure 1:
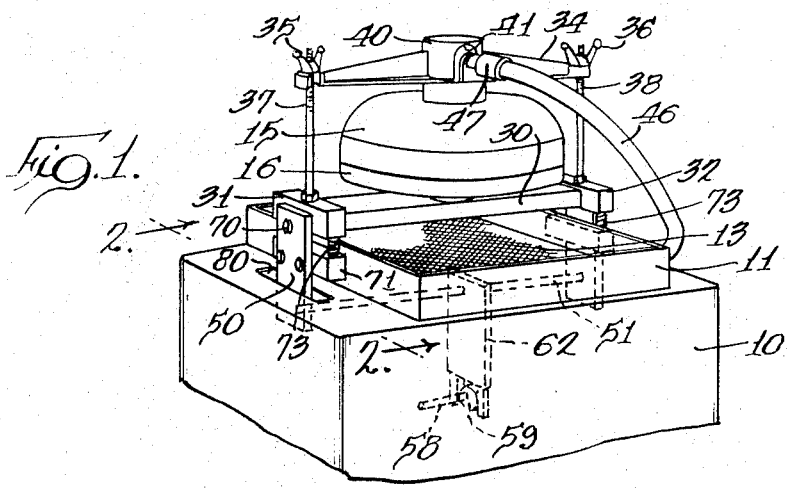

This invention relates to cleaning of torque converters and, more particularly, to a process and apparatus for cleaning torque converters using constant flow of cleaning fluid with simultaneous agitation of the torque converter.

Torque converters, as used in automatic transmissions for vehicles frequently must be cleaned and with present constructions thereof it is not possible to disassemble the converter body to permit simple cleaning of the interior parts. The cleaning is important because contaminants suspended in automatic transmission fluid and inside the torque converter may be circulated to the valving of the transmission system, resulting in serious malfunctioning of the transmission. It is recommended procedure to thoroughly clean torque converters prior to reassembly of transmissions which have been dissembled. It has been known to attempt cleaning of the torque converter by filling thereof with cleaning fluid, such as kerosene, and shaking the converter and then draining the fluid from the converter body. Because of the shape of the interior parts of the torque converter, this process is a haphazard way of attempting cleaning of the torque converter. Another method known in the art is to cut the welded seam of the two-part torque converter body to get at the interior parts and then re-weld the body parts together after cleaning, which is a time-consuming and expensive method.

An object of this invention is to provide a new and improved process and apparatus for cleaning of torque converters utilizing continuous flow of cleaning fluid through the torque converter while simultaneously agitating the converter to thoroughly distribute the fluid in the converter and pick up contaminants within the converter.

Still another object of the invention is to provide a new and improved process and apparatus for cleaning of torque converters having drain openings wherein the torque converter is continuously rocked back and forth in an arc and cleaning fluid is simultaneously supplied to the interior of the torque converter and the cleaning fluid is permitted to flow from the body during the rocking movement and is collected.

A further object of the invention is to provide a torque converter cleaning apparatus for cleaning a torque converter having drain openings comprising, a stand housing motor and pump components with a cleaning fluid collector and filter unit and a rocker bar overlying the collector and filter unit for support of a torque converter to be cleaned, the drain openings overlying the collector and filter unit, an adapter cup having a fluid seal for engagement with the front drive coupling of the torque converter and a cleaning fluid inlet fitting and a passage for communicating with an opening in the front drive coupling, the rocker bar having means for releasably engaging the adapter cup to hold the cup in association with the torque converter body and to hold the torque converter on the rocker bar, flexible piping means for supplying cleaning fluid under pressure to said fluid inlet fitting, and means for rocking the rocker bar and torque converter carried thereby back and forth in an arc limited in extent to always have the drain openings overlie said fluid collector.

An additional object of the invention is to provide a cleaning apparatus as defined in the preceding paragraph wherein the rocker bar is yieldably mounted about a secondary pivot axis to provide for additional snap or whipping action of the torque converter carried thereby near the limits of the arc of travel of the rocker bar to further insure thorough distribution of cleaning fluid within the torque converter.

Figure 2:
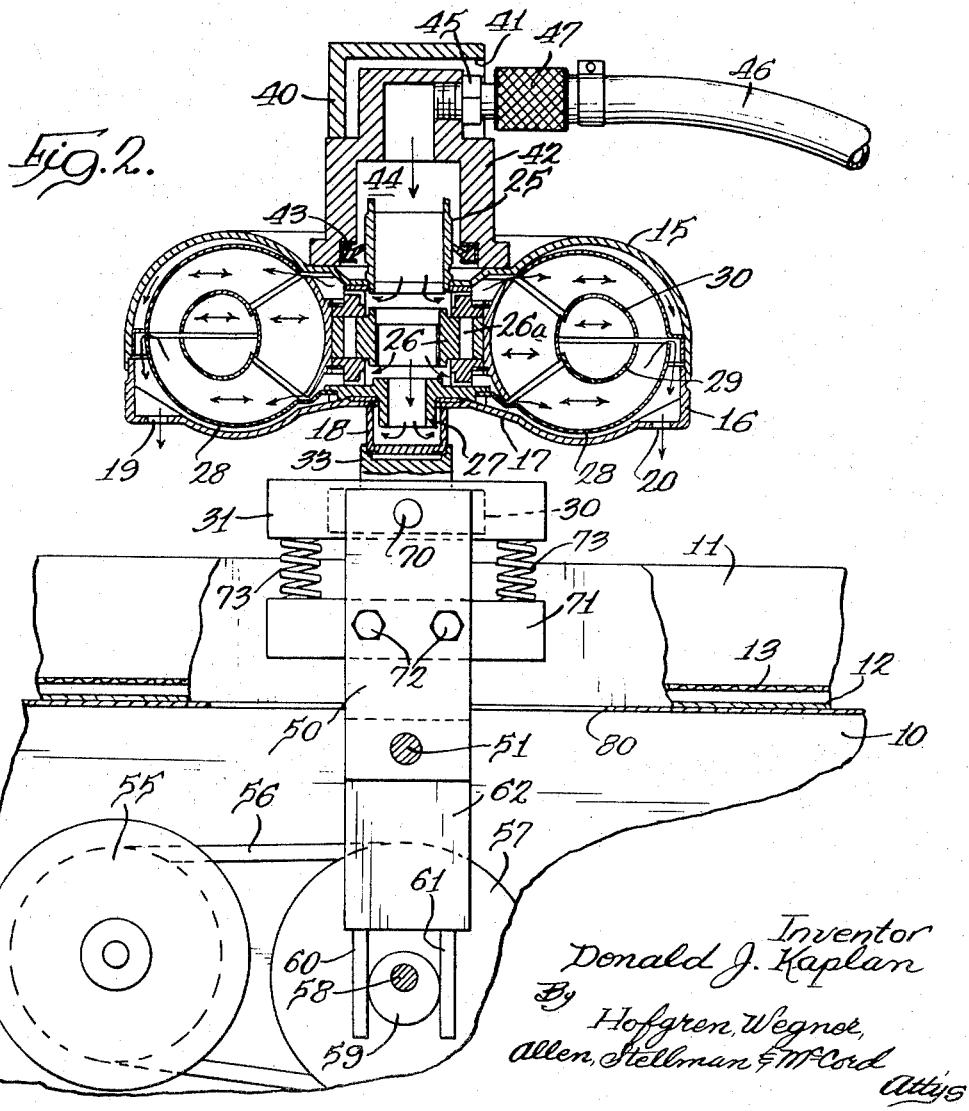

Further objects and advantages will become apparent from the following detailed description taken in connection with the accompanying drawings in which:

FIG. 1 is a fragmentary perspective view of the torque converter cleaning apparatus; and FIG. 2 is a vertical section on an enlarged scale, taken generally along the line 2—2 in FIG. 1.

While the apparatus of this invention is susceptible of emobdiment in many different forms, there is shown in the drawings and will herein be described in detail an apparatus embodiment of the invention with the understanding that the present disclosure is to be considered as an exemplification of the principles of the invention and is not intended to limit the invention to the embodiment illustrated. The scope of the invention will be pointed out in the appended process and apparatus claims.

The apparatus is shown generally in FIG. 1 and embodies a stand 10 in the form of a cabinet which houses a drive mechanism shown more particularly in FIG. 2 and also a pump for cleaning fluid, such as kerosene, to be supplied to the torque converter. The stand 10 has a collector and filter unit including a tray 11 mounted at the top thereof having a bottom panel 12 and which receives a filter 13 positioned above the tray bottom 12 for filtering contaiminants from the cleaning fluid discharged from the torque converter. The tray bottom 12 has an outlet opening (not shown) leading to the inlet of a fluid circulating pump (not shown) for redistributing cleaning fluid to the torque converter.

The torque converter typical of those that can be cleaned by the apparatus and process disclosed herein is shown in FIGS. 1 and 2 and comprises two-part body having parts 15 and 16. These parts are welded together in the area of circumferential overlap. The body part 16 has a side 17 from which a crank shaft pilot 18 extends and a pair of drain openings 19 and 20 which, after cleaning, are closed off by removable plugs (not shown). In the event that the torque converter is not provided with drain openings, it is optionally possible, in order to permit the use of the process and apparatus, to machine a pair of drain openings in the side 17 which, after cleaning, can be closed off by expandable plugs.

The internal construction of the torque converter is well-known and only general reference need be made thereto. The torque converter includes a front drive coupling 25 extending from the body part 15. Disposed centrally within the converter, is a stator hub 26 and a stator clutch 26a. A runner hub 27 is located at the side of the converter opposite the front drive coupling 25, and a runner 28 extend radially outward from the hub. The torque converter includes the relatively movable concave elements 29 and 30 positioned generally opposite each other. The element 29, because of its concavity, forms pockets for holding fluid and thus is difficult to clean. By the process and apparatus disclosed herein, the cleaning of these elements is achieved.

For cleaning, the torque converter is mounted in position to overlie the collector and filter unit. This mounting is accomplished by a rocker mechanism having a rocker bar 30 extending over the tray 11 and having blocks 31 and 32 connected to the ends thereof. The rocker bar 30 has a converter mounting member 33 affixed thereto intermediate the ends, with a recess for receiving the crankshaft pilot of the converter to locate the torque converter. Releasable means for holding the torque converter in association with the rocker bar includes a retaining bar 34 overlying the rocker bar in spaced relation thereto and releasably attached by wing nuts 35 and 36 to threaded rods 37 and 38, respectively, extending upwardly from the rocker arm blocks 31 and 32.

The retaining bar 34 has a centrally-positioned cap 40 provided with a notch 41 in the side wall thereof which fits over an adapter cup 42, as shown particularly in FIG. 2. The cap in engaging the adapter cup 42 holds the cup in association with the torque converter and also holds the torque converter on the rocker bar for movement therewith. The adapter cup 42 has an annular seal 43 at the lower end thereof for sealing engagement with the outer periphery of the front drive coupling 25 of the torque converter and has an internal passage 44 extending to a cleaning fluid inlet fitting 45 whereby cleaning fluid supplied to the fitting 45 is directed through the passage 44 through the interior of the front drive coupling 25 to flow through the torque converter, as shown generally by the directional arrows in FIG. 2. The supply cleaning fluid to the fitting 41 is through a flexible hose 46 releasably engageable with the fitting 45 through a quick-release coupling 47 and the hose is connected to a motor driven pump (not shown) which can be of any suitable type for delivering cleaning fluid under pressure to the adapter cup 42 and with the pump being supplied with filtered cleaning fluid delivered from the collector and filter unit. The notch 41 in the retaining cap 40 permits extension of the adapter cup fitting 45 outwardly for connection of the cleaning fluid delivery hose 46.

As evident in FIG. 2, the fluid delivered through the adapted cup 42 flows into the torque converter and is permitted to flow out of the torque converter through the drain openings 19 and 20, with the fluid dropping to the collector tray 11 where it is filtered prior to recirculation. In order to obtain proper cleaning action and to get the complete exposure of the converter parts to the fluid, means are provided to rapidly rock the torque converter while fluid flows therethrough with this rocking action being in a plane containing the drain openings whereby the fluid is thrown within the converter in the direction of the openings.

The means for rocking the torque converter includes a pair of identical arms at opposite ends of the rocker bar 30 with one of the arms 50 being shown in FIG. 1 and and with a second arm (not shown) being at the far side of the stand. These arms are fixed to a shaft 51 rotatably mounted within the stand 10 whereby oscillation of the shaft 51 rocks the arms 50 back and forth to impart movement to the rocker bar 30 in an arc. The drive is otbained from a motor 55, shown schematically in FIGURE 2, having an output pulley which drives a belt 56 engaged with a driven pulley 57 on a second rotatable shaft 58 extending across the stand 10 and rotatably mounted thereon and having an eccentric 59 engaged between a pair of legs 60 and 61 depending from an actuator plate 62 which extends upwardly and is fixed to the transverse shaft 51 to which the arms 50 are connected.

Rotation of the motor 55 results in rotation of the eccentric 59 which rocks the actuator plate 62 about the axis of shaft 51 and the connection of this plate to the shaft and the arms results in rocking of the arms 50 about the axis of shaft 51. The rocker bar blocks 31 and 32 are pivotally connected to the upper ends of the arms 50 by a pivot pin 70 associated one with each, as shown in FIGS. 1 and 2. In order to normally maintain the rocker bar in a central position about the pivot pins 70, and to cause a snap or whip action of the torque converter near the limits of the arc movement, a yieldable means is provided including a block 71 affixed to each of the arms 50 near the upper end thereof by means of bolts 72 and a pair of compression springs 73 extend between the block 71 and the block 31 of the arm 50. The same construction is associated with the arm 50 at the far side of the stand, as viewed in FIG. 1.

The throw of the eccentric 59 provides a rocking action for the rocker bar 30 and the torque converter with limits of movement to have the drain openings 19 and 20 always overlie the collector and filter unit. This throw is permitted by the openings 80 in the top of the stand to permit the rocking movement of the arms 50. With the yieldable connection provided by the springs 73, the momentum imparted to the torque converter will result in a snap or whip action at the end of the arc of travel, as the torque converter pivots about the pivot pins 70 and then is restored to its central position as the torque converter starts back on the return part of the arc of travel.

From the foregoing description, the manner of mounting a torque converter in the cleaning apparatus and the mode of operation for obtaining the cleaning is believed apparent, with the rocking action causing circulation of fluid for cleaning through the torque converter in the general manner shown by the directional arrows in FIG. 2 and with the concave surfaces 29 also being thoroughly cleaned.

As disclosed herein, the method of cleaning embodies the simultaneous agitation of the torque converter in a back and forth movement along an arc along with the continuous delivery of cleaning fluid to the torque converter and exhaustion of this fluid therefrom.

I claim:

1. A torque converter cleaning apparatus for cleaning a torque converter comprising, a stand for housing motor and pump components, a cleaning fluid collector on said stand, a rocker bar overlying said collector and having a recepticle for receiving a part of the torque converter body, releasable means carried by the rocker bar for holding the torque converter on the rocker bar including a retaining bar, an adapter cup having a fluid seal for engagement with the front drive coupling of the torque converter and held in position by the retaining bar, said cup having a cleaning fluid inlet fitting and a passage for communicating with an opening in said front drive coupling, means for supplying cleaning fluid under pressure to said fluid inlet fitting, and means for rocking said rocking bar and the torque converter carried thereby back and forth in a limited arc including a pair of arms mounted at opposite sides of said stand for movement about a pivot axis, said rocker bar being pivoted at its ends to said arms, spring means extending between said arms and rocker bar to yieldably hold the rocker bar in a central position relative to the arms but permitting relative movement thereto near the ends of the arc of travel to provide a whipping action of the rocker bar and torque converter carried thereby to thoroughly distribute cleaning fluid, and means for oscillating said arms about said axis.

2. A torque converter cleaning apparatus for cleaning a torque converter having a pair of drain openings on one side thereof comprising, a stand housing component providing circulation of cleaning fluid and a drive power source, a cleaning fluid collector and filter unit positioned on the stand for receiving and filtering fluid discharged from the drain openings of the torque converter, a rocker bar overlying the collector and filter unit and having an element for engaging a part of the torque converter body on the same side as said drain openings to have the openings overlying the collector and filter unit, an adapter cup having a fluid seal for engagement with a part of the torque converter body, releasable means carried by the rocker bar and engageable with the adapter cup for holding the cup in association with the torque converter and for holding the torque converter on the rocker bar, means for rocking the rocker bar and torque converter carried thereby in an arc limited in extent to always have the drain openings overlie the fluid collector and filter unit and including a pair of arms adjacent opposite ends of the rocker bar and carrying said rocker bar for movement about a pivot axis, and spring means extending between said arms and rocker bar to yieldably hold the rocker bar in a central position relative to the arms but permitting relative movement to provide a snap action of the rocker bar near the limits of its travel, said cup having a cleaning fluid inlet fitting and a passage for communicating with an opening in the torque converter body, and means for continuously supplying cleaning fluid under pressure to the fluid inlet fitting whereby the fluid can flow through the converter body and out the drain openings while thoroughly agitated within the body resulting from the rocking motion imparted to the torque converter.

References Cited

UNITED STATES PATENTS

| | | | |
|---|---|---|---|
| 1,960,640 | 5/1934 | Lajeunesse | 259—75 |
| 2,206,669 | 7/1940 | Kowalski | 259—72 |
| 3,082,775 | 3/1963 | Timmerman et al. | 134—160 XR |

MORRIS O. WOLK, Primary Examiner

D. G. MILLMAN, Assistant Examiner

U.S. Cl. X.R.

134—23, 32, 150, 160, 163; 259—1